May 24, 1949.  N. WYETH  2,471,135
MOTOR VEHICLE
Filed Feb. 12, 1945  2 Sheets-Sheet 1

INVENTOR.
Nathaniel Wyeth.
BY Harness & Harris
ATTORNEYS.

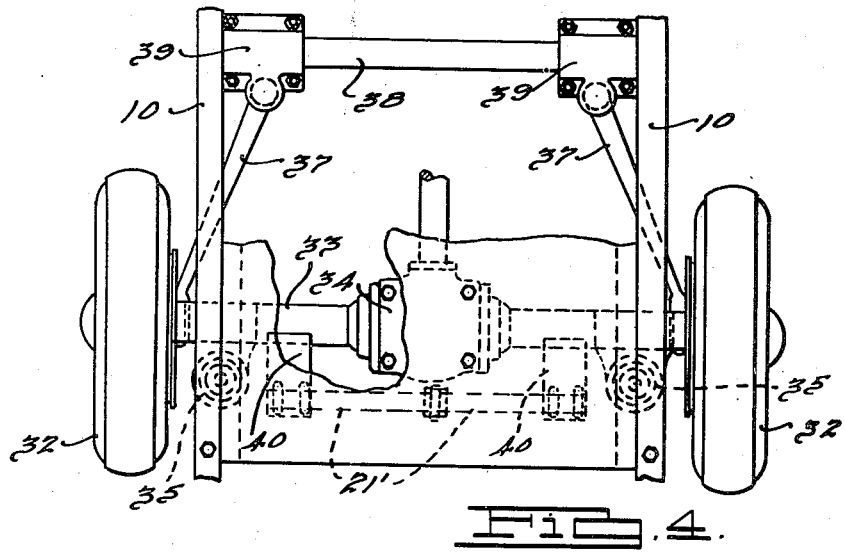
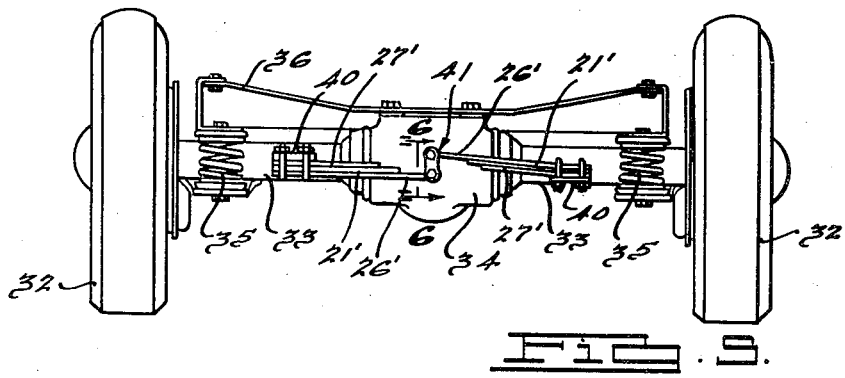
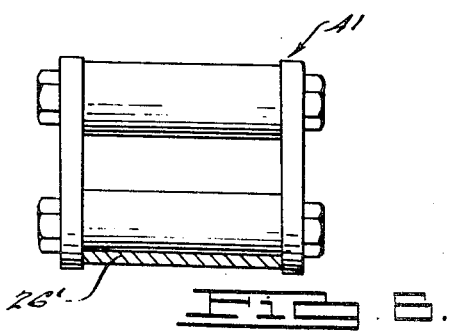

Patented May 24, 1949

2,471,135

UNITED STATES PATENT OFFICE 2,471,135

MOTOR VEHICLE

Nathaniel Wyeth, Detroit, Mich., assignor to Chrysler Corporation, Highland Park, Mich., a corporation of Delaware Application February 12, 1945, Serial No. 577,389

17 Claims. (Cl. 267—11)

This invention relates to improvements in stabilizing or anti-sway means for motor vehicles and more particularly to such vehicles equipped with independent wheel suspension.

An object of the invention is the provision of stabilizing means which is positive in its action and which readily responds to conditions requiring the exercise of control and is, therefore, timely in its action.

Another object of the invention is to provide a stabilizing means which produces a dampening effect and by reason thereof minimizes abnormal wheel movement of the character commonly referred to as wheel fight.

In carrying out the foregoing objects the stabilizing means yieldably opposes relative rising and falling movement of a pair of vehicle road wheels and includes a pair of springs subjected to longitudinal bending stress and being transversely deflected in opposing the aforesaid relative movement. Stabilizing means of this type can be readily adapted to independent wheel suspension system and particularly in connection with the steerable ground wheels without restricting steering movement of such wheels.

Various objects and advantages of the invention will be more apparent from the following description taken in connection with the accompanying drawings, in which:

Fig. 4 is a view similar to Fig. 1 but showing the invention associated with non-steerable road wheels.

Fig. 5 is a front elevational view of the Fig. 4 showing.

Fig. 6 is a view taken as indicated by line 6—6 of Fig. 5.

Figure 1:
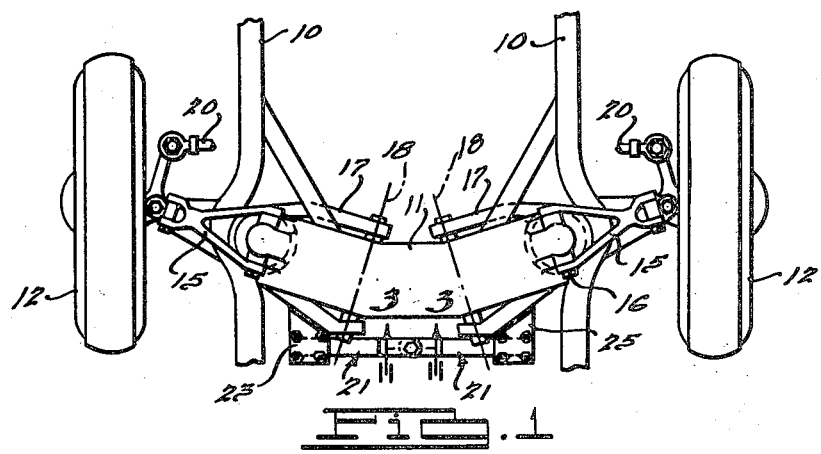
Fig. 1 is a top plan view of the front end of a motor vehicle showing the invention associated with the steerable road wheels.
Figure 2:
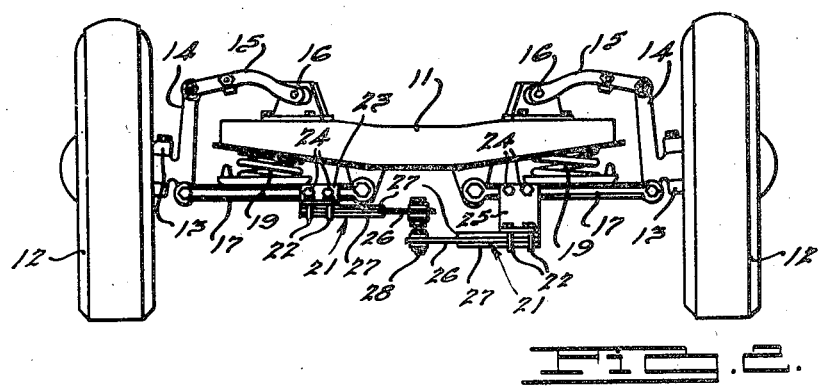
Fig. 2 is a front elevational view of the Fig. 1 showing.
Figure 3:
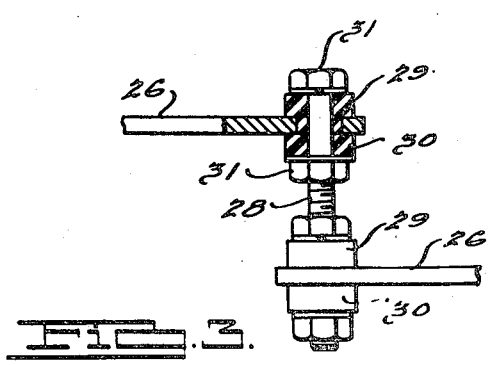
Figure 3 is a view, partly in section, taken as indicated by the line 3—3 of Fig. 1.

Referring to Figs. 1, 2, and 3, the vehicle chassis includes a frame structure having longitudinally extending side rails 10 and a front cross member 11. Each road wheel 12 is mounted on an axle (not shown) provided with a yoke portion 13 which is swivelly connected for steering movement with an upright knuckle bracket 14. Each wheel suspension includes an upper arm structure 15 pivoted at 16 on the frame structure and a lower arm structure 17 pivoted to the frame structure for swinging movement on the axis 18. A coil spring 19 acts between the frame cross member 11 and each lower arm structure 17 for yieldably supporting the frame on the ground wheels.

The independent wheel suspension accommodates rising and falling movement of each wheel 12 relative to the frame and independently of the remaining wheels of the vehicle, the arm structures 15 and 17 maintaining the associated bracket 14 in the desired position and guiding the wheel during the aforesaid movement. Suitable mechanism of the desired type may be connected with the rods 20 for imparting steering movement to the wheels 10.

The stabilizing means includes two metallic springs, generally indicated by the numeral 21, relatively arranged for application to the illustrated structure to provide a pair of non-adjacent ends and a pair of adjacent ends. One of the non-adjacent ends is secured by U-clips 22 to a bracket 23 which is secured by bolts 24 to the front member of the structure 17 at the left of the vehicle as viewed from the front thereof. The other non-adjacent end is similarly attached to a bracket 25 which is in turn secured by bolts 24 to the front member of the other arm structure 17. The brackets 23, 25 are of such effective relative height that the adjacent ends of the springs 21 are vertically spaced, as is more particularly shown in Fig. 2. It will, therefore, be apparent that the non-adjacent ends of the spring 21 will move with its associated arm structure as the latter swings incident to rising and falling movement of its associated road wheel 12.

Each spring 21 includes a relatively long leaf 26 projecting longitudinally beyond and disposed between relatively short leaves 27. The free ends of the leaves 26 are vertically spaced and, as shown in Fig. 3, each such end has an enlarged opening or eye receiving a connecting pin 28. Bushings 29 and 30 of rubber or like material engage respective opposite faces of each leaf 26, the bushing 29 having a neck extending into the opening between the wall thereof and the pin 28. Each leaf end and the bushings 29, 30 are retained in assembled position between nuts 31 threaded on the pin 28.

In operation the stabilizing means interposes little if any opposition to corresponding movement of the wheels and the arm structures 17. For example, should each wheel simultaneously rise and swing the arm structures 17 upwardly, the non-adjacent ends of the springs will correspondingly move and the adjacent ends will swing downwardly. However, relative movement of the wheels will be resisted as, for example, should one thereof rise carrying with it the associated arm structure 17 and the non-adjacent end of the spring secured thereto, downward movement of the other end of the latter spring will be yieldably opposed by the other spring. Such relative movement subjects each spring to longitudinal bending stress resulting in transverse deflection. The structure acts positively as well as timely in the performance of its function.

It will be understood that a single leaf 26 or similar bar element may constitute each spring 21 and thus function to stabilize relative movement of the wheels. However, as is well known the road wheels are frequently subjected to abnormal movements incident to the rising and falling thereof, whether the suspension be of the independent type or otherwise. This abnormal movement is commonly referred to as wheel fight and is particularly objectionable when present in the steering wheels as the same is reflected in the steering mechanism. I have found that the use of a multiple leaf spring produces a dampening effect which materially minimizes abnormal wheel movement or wheel fight. This dampening effect is produced by frictional engagement of the leaves and the tendency of relative movement thereof incident to deflection resulting from relative movement of the wheels. While the type of spring shown may be most conveniently and economically employed for the foregoing advantages, it will nevertheless be understood that the invention in its broad aspects is not necessarily limited to the illustrated embodiment.

Referring to Figs. 4, 5, and 6, the invention is illustrated in connection with a pair of driving wheels 32 each of which includes a suitable driving axle (not shown) disposed in a housing 33 suitably connected with the differential drive housing 34 for rising and falling movement relative thereto and independently of the other housing 33, it being understood that each driving axle is connected to the differential mechanism for similar movement. Rear springs 35 are provided together with a frame cross member 36 to which the housing 34 is secured. Each wheel and associated axle housing 33 has secured thereto one end of a radius rod 37, the other end of the latter having a ball joint connection with a frame cross member 38 through a detachable member 39.

The stabilizing means includes a pair of springs 21' relatively arranged to provide a pair of non-adjacent ends respectively secured to the housings 33, by means of a bracket 40, for movement therewith and a pair of adjacent ends vertically spaced and secured together by a shackle construction indicated at 41. The springs 21' operate with respect to the wheels 32 as do the springs 21 in connection with the wheels 12.

I claim:

1. In a vehicle including a pair of oppositely disposed road wheels and means supporting and guiding each of said wheels for independent rising and falling movement, each of said means including a member mounted for oscillatory movement about a substantially horizontally disposed axis spaced from the axis of the other member to accommodate movement of its associated wheel, stabilizing means including a pair of leaf springs respectively operably associated with said members and disposed generally transversely with respect to the axis of oscillatory movement of the associated member, said springs being relatively arranged to provide a pair of non-adjacent end portions each disposed outwardly with respect to the vehicle beyond the axis of oscillatory movement of its associated member and secured to the latter for movement therewith and a pair of adjacent end portions offset vertically one relative to the other and disposed between said axes of oscillation of said members, and a force transmitting link connecting said adjacent end portions for cooperation with said non-adjacent end portions to thereby yieldably oppose relative oscillatory movement of said members by stress of said springs transversely of the longitudinal axis of the latter.

2. In a vehicle including a pair of oppositely disposed road wheels and means supporting and guiding each of said wheels for independent rising and falling movement, each of said means including a member mounted for oscillatory movement about an axis spaced from such axis of the other member to accommodate movement of its associated wheel, stabilizing means including a pair of leaf springs respectively operably associated with said members and disposed generally transversely with respect to the axis of oscillatory movement of the associated member, said springs being relatively arranged to provide a pair of non-adjacent end portions respectively secured to the associated member at a location disposed outwardly with respect to the vehicle beyond the axis of said associated member for movement with the latter and a pair of adjacent end portions disposed intermediate said axis, and means connecting said adjacent end portions together whereby relative oscillation of said members is yieldably opposed by said springs.

3. In a vehicle including a pair of oppositely disposed road wheels and means supporting and guiding each of said wheels for independent rising and falling movement, each of said means including a member mounted for oscillatory movement about an axis spaced from such axis of the other member to accommodate movement of its associated wheel, stabilizing means including spring elements relatively arranged to provide a pair of non-adjacent ends respectively secured to said members at a location disposed outwardly with respect to the vehicle beyond the axis of said associated member for movement with the latter and a pair of adjacent ends disposed intermediate said axis, means connecting said adjacent ends together for cooperation with said non-adjacent ends to yieldably oppose relative movement of said members as aforesaid by transverse deflection of at least one of said elements, and friction dampening means engaged with each of said elements intermediate the said ends thereof incident to deflection thereof as aforesaid.

4. In a vehicle including a frame and a pair of oppositely disposed road wheels, supporting and guiding means for each of said wheels accommodating independent rising and falling movement thereof, each of said means including a wheel-carrying part and upper and lower arranged arms having an articulated connection with said wheel-carrying part and mounted for oscillatory movement to accommodate the aforesaid movement of its associated wheel, each of said lower arms being mounted for movement as aforesaid about a fixed axis spaced from the axis of the other lower arm in a direction laterally of the vehicle, a weight supporting spring between each lower arm and the frame, and a resiliently deflectible stabilizer structure arranged generally transversely with respect to said axes operable by resilient deflection thereof to oppose relative movement of said lower arms and including opposite end portions respectively secured to said lower arms independently of the associated weight supporting spring for movement therewith and at a location intermediate the axis thereof and the associated wheel-carrying part, said structure intermediate said end portions bridging said axes and being free from restraint by the vehicle and by each of said supporting and guiding means in resiliently resisting such relative movement.

5. In a vehicle including a pair of oppositely disposed road wheels and means supporting and guiding each of said wheels for independent rising and falling movement, each of said means including a member mounted for oscillatory movement about a substantially horizontally disposed axis spaced from the axis of the other member to accommodate movement of its associated wheel, stabilizing means including a pair of leaf spring units respectively operably associated with said members and disposed generally transversely with respect to the axis of oscillatory movement of the associated member, said spring units being relatively arranged to provide a pair of non-adjacent end portions each disposed outwardly with respect to the vehicle beyond the axis of oscillatory movement of its associated member and secured to the latter for movement therewith and a pair of adjacent end portions offset vertically one relative to the other and disposed between said axes of oscillation of said members, each of said units including a plurality of leaves at said non-adjacent end thereof and certain of said leaves terminating short of said adjacent end thereof, and a force transmitting link connecting said adjacent end portions for cooperation with said non-adjacent end portions to thereby yieldably oppose relative oscillatory movement of said members by stress of said spring units transversely of the longitudinal axis of the latter.

6. In a vehicle including a pair of oppositely disposed road wheels and means supporting and guiding each of said wheels for independent rising and falling movement, each of said means including a member mounted for oscillatory movement about a substantially horizontally disposed axis spaced from the axis of the other member to accommodate movement of its associated wheel, stabilizing means including a pair of springs respectively operably associated with said members and disposed generally transversely with respect to the axis of oscillatory movement of the associated member, said springs being relatively arranged to provide a pair of non-adjacent end portions each disposed outwardly with respect to the vehicle beyond the axis of oscillatory movement of its associated member and secured to the latter for movement therewith and a pair of adjacent end portions and means connecting said adjacent end portions for cooperation with said non-adjacent end portions to yieldably oppose relative oscillatory movement of said members by resilient deflection of said springs, each of said springs increasing in section from a minimum at the adjacent end portions to a maximum at the non-adjacent end portion thereof whereby each spring is more flexible at its adjacent end portion than at its non-adjacent end portion.

7. In a vehicle including a body-carrying frame structure and a pair of oppositely disposed road wheels, means supporting and guiding each of said wheels for independent rising and falling movement, each of said means including a wheel supporting member connected to said frame structure for oscillatory movement relative to a fixed axis, spaced from the fixed axis of the other such member in a direction transversely of the frame structure, to accommodate movement of its associated wheel, a weight supporting spring between each member and said frame structure, and stabilizing means including a pair of leaf springs respectively disposed generally transversely with respect to said axis and operable to yieldably resist relative oscillation of said members, said leaf springs being relatively arranged to provide a pair of non-adjacent end portions respectively secured to said members independently of said weight supporting springs for movement with such members, and a pair of adjacent end portions disposed between said axes and connected one with the other for cooperation with said non-adjacent end portions to yieldably oppose relative oscillation of said members by stress of said leaf springs transversely of the longitudinal axis of the latter.

8. In a vehicle including a body-carrying frame structure and a pair of oppositely disposed road wheels, means supporting and guiding each of said wheels for independent rising and falling movement, each of said means including a wheel supporting member connected to said frame structure for oscillatory movement relative to a fixed axis spaced from the axis of the other such member to accommodate movement of its associated wheel, a weight supporting spring between each of said members and said frame structure, and stabilizing means including a pair of leaf spring units respectively disposed generally transversely with respect to said axes and operable to yieldably resist relative oscillation of said members, said spring units being relatively arranged to provide a pair of non-adjacent end portions and a pair of adjacent end portions disposed between said axes and offset vertically one relative to the other, means securing said non-adjacent end portions respectively to said members independently of the associated weight supporting spring for movement with such members, and a force transmitting connection between said adjacent end portions for cooperation with said non-adjacent ends to oppose said relative oscillation of said members, each of said units including a plurality of leaves at said non-adjacent end portions and certain of said leaves terminating short of said adjacent end of the unit.

9. In a vehicle including a body carrying frame and a pair of oppositely disposed road wheels, means supporting and guiding each of said wheels from said frame for rising and falling movement independently of the other wheel, each of said means including a wheel carrying part and upper and lower linkages each having an articulated connection with said wheel carrying part, means connecting each upper linkage to said frame for oscillation relative thereto, means connecting each lower linkage to said frame structure for oscillation relative thereto about a fixed axis spaced from such axis of the other lower linkage in a direction laterally of the vehicle, a weight supporting spring between each lower linkage and the frame, and stabilizing means operable to resist rising and falling movements of each wheel relative to the other including leaf springs arranged generally transversely with respect to said axes and respectively connected with said lower linkages for movement therewith, the connection between each leaf spring and its lower linkage being spaced from the said axis of the latter in a direction laterally with respect to the vehicle, said leaf springs extending one toward the other from the respective connections thereof with said frame and each leaf spring having a portion thereof disposed between the axes of said lower linkages, and means connecting said leaf springs intermediate said axes for reaction one against the other in response to relative oscillation of said lower linkages.

10. In combination, a vehicle frame, an individual wheel suspension at each side of the frame and each including a laterally extending arm connected to the frame for swinging movement about a substantially horizontal axis extending longitudinally of the frame, and resilient bar means extending laterally of the frame, the outer end portions of the bar means being substantially rigidly connected to the arms respectively with each connection located between the frame connection for the arm and the outer end of the arm, said bar means being free from any controlling connection with other parts of the vehicle.

11. In combination with a vehicle frame and an individual wheel suspension at each side of the frame, said suspensions including arms pivoted to the frame at their inner ends and extending outwardly away from one another laterally of the frame for swinging movement about a substantially horizontal axis extending longitudinally of the frame, a resilient bar element rigidly connected to each arm in the region between its pivot and its outer end and extending laterally of the frame to a point between the two pivots for the arms, and means movably connecting the inner ends of the two bar elements and comprising an eye on the inner end of one bar and means connected with the other bar extending through the eye.

12. In combination with a vehicle frame and an individual wheel suspension at each side of the frame, said suspensions including arms pivoted to the frame at their inner ends and extending outwardly away from one another laterally of the frame for swinging movement about a substantially horizontal axis extending longitudinally of the frame, a weight-supporting spring between each arm and the frame, and stabilizing means including a resilient bar element rigidly connected to each arm in the region between its pivot and its outer end and extending laterally of the frame to a point between the two pivots for the arms, and means movably connecting the inner ends of the two bar elements and comprising an eye on the inner end of one bar and means connected with the other bar and moveable therewith extending through the eye.

13. In combination with a vehicle frame and an individual wheel suspension at each side of the frame, said suspensions including arms pivoted to the frame at their inner ends and extending outwardly away from one another laterally of the frame for swinging movement about a substantially horizontal axis extending longitudinally of the frame, a resilient bar element rigidly connected to each arm in the region between its pivot and its outer end and extending laterally of the frame to a point between the two pivots for the arms, and pivotal means connecting the inner ends of the two bar elements and comprising an eye on the inner end of each bar and a pin extending through the eyes.

14. In combination, a vehicle frame, weight-supporting spring means associated with the frame, an individual wheel suspension at each side of the frame, said suspensions including arms pivoted to the frame at their inner ends and extending outwardly away from one another laterally of the frame for swinging movement about a substantially horizontal axis extending longitudinally of the frame, and stabilizing means including a leaf spring rigidly connected to each arm in the region between its pivot and its outer end and extending laterally of the frame to a point between the two pivots for the arms, and pivotal means connecting the inner ends of the two leaf springs and free from connection with the frame.

15. In combination with a vehicle frame and an individual wheel suspension at each side of the frame, said suspensions including arms pivoted to the frame at their inner ends and extending outwardly away from one another laterally of the frame for swinging movement about a substantially horizontal axis extending longitudinally of the frame, a resilient bar element rigidly connected to each arm in the region between its pivot and its outer end and extending laterally of the frame to a point between the two pivots for the arms, and pivotal means connecting the inner ends of the two bar elements.

16. In combination with a vehicle frame and an individual wheel suspension at each side of the frame, said suspensions including arms pivoted at their inner ends to the frame and extending outwardly away from one another laterally of the frame for swinging movement about a substantially horizontal axis extending longitudinally of the frame, a resilient bar element rigidly connected to each arm in the region between the pivot for the arm and the outer end of the arm, and means including flexible rubber connecting the inner ends of the two bar elements.

17. In combination with a vehicle frame and an individual wheel suspension at each side of the frame, said suspensions including arms pivoted at their inner ends to the frame and extending outwardly away from one another laterally of the frame for swinging movement about a substantially horizontal axis extending longitudinally of the frame, a resilient bar element rigidly connected to each arm in the region between the pivot for the arm and the outer end of the arm, and means movably connecting the inner ends of the bar elements, said bar elements being free from any controlling connection with the frame.

NATHANIEL WYETH.

REFERENCES CITED

The following references are of record in the file of this patent:

UNITED STATES PATENTS

| Number | Name | Date |
| --- | --- | --- |
| 475,304 | Faske | May 24, 1892 |
| 2,112,981 | Best | Apr. 5, 1938 |
| 2,169,373 | Porsche | Aug. 15, 1939 |
| 2,190,298 | Slack | Feb. 13, 1940 |
| 2,225,966 | Beemer | Dec. 24, 1940 |
| 2,254,261 | Best | Sept. 2, 1941 |
| 2,314,076 | Casner | Mar. 16, 1943 |
| 2,353,603 | Vancoppenolle | July 11, 1944 |

FOREIGN PATENTS

| Number | Country | Date |
| --- | --- | --- |
| 27,702 | Great Britain (1913) | Oct. 22, 1914 |
| 357,638 | Great Britain | Sept. 21, 1931 |
| 621,468 | France | Feb. 5, 1927 |